United States Patent
Liu et al.

(10) Patent No.: US 12,302,454 B2
(45) Date of Patent: *May 13, 2025

(54) POWER INDICATION METHOD AND APPARATUS

(71) Applicant: HUAWEI TECHNOLOGIES CO., LTD., Guangdong (CN)

(72) Inventors: Xianda Liu, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/644,756

(22) Filed: Apr. 24, 2024

(65) Prior Publication Data

US 2024/0298168 A1 Sep. 5, 2024

Related U.S. Application Data

(63) Continuation of application No. 17/215,561, filed on Mar. 29, 2021, now Pat. No. 11,997,754, which is a (Continued)

(30) Foreign Application Priority Data

Sep. 29, 2018 (CN) .......................... 201811152760.9

(51) Int. Cl.
*H04B 7/00* (2006.01)
*H04B 17/10* (2015.01)
*H04W 8/22* (2009.01)

(52) U.S. Cl.
CPC ............ *H04W 8/22* (2013.01); *H04B 17/102* (2015.01)

(58) Field of Classification Search
CPC ....... H04W 8/22; H04W 52/146; H04W 8/24; H04W 52/365; H04W 52/367;
(Continued)

(56) References Cited

U.S. PATENT DOCUMENTS 8,605,614 B2 12/2013 Nishio et al.
8,676,241 B2 3/2014 Hashimoto et al.
(Continued)

FOREIGN PATENT DOCUMENTS

CN 102300303 12/2011
CN 102348269 2/2012
(Continued)

OTHER PUBLICATIONS

3GPP TS 38.101-1 V15.2.0 (Jun. 2018), "3rd Generation Partnership Project; Technical Specification Group Radio Access Network; NR; User Equipment (UE) radio transmission and reception; Part 1: Range 1 Standalone(Release 15)," Jun. 2018, 128 pages.
(Continued)

*Primary Examiner* — Amancio Gonzalez
(74) *Attorney, Agent, or Firm* — Fish & Richardson P.C.

(57) ABSTRACT

This disclosure provides power indication methods and apparatuses for wireless communications. In an implementation, a method includes: receiving antenna transmit capability information from a terminal device, wherein the antenna transmit capability information indicates whether a maximum transmit power value of a physical uplink shared channel (PUSCH) corresponding to each sounding reference signal (SRS) port in a SRS resource reaches a preset power value, and determining based on the antenna transmit capability information, whether the maximum transmit power value of the PUSCH corresponding to each SRS port in the SRS resource reaches the preset power value.

12 Claims, 5 Drawing Sheets

Related U.S. Application Data continuation of application No. PCT/CN2019/109100, filed on Sep. 29, 2019.

(58) Field of Classification Search
CPC ... H04W 52/28; H04B 17/102; H04B 7/0465; H04B 7/0639; H04B 7/0486; H04B 7/0404; H04L 5/0023; H04L 5/0048
USPC ......................................................... 370/310
See application file for complete search history.

(56) References Cited

U.S. PATENT DOCUMENTS

| | | | |
|---|---|---|---|
| 9,031,146 B2 | 5/2015 | Shin et al. | |
| 9,264,954 B2 | 2/2016 | Radulescu et al. | |
| 9,491,793 B2 | 11/2016 | Pelletier et al. | |
| 9,749,968 B2 * | 8/2017 | Stern-Berkowitz | ........................ H04W 52/325 |
| 9,900,808 B2 | 2/2018 | Kizhakkemadam et al. | |
| 9,923,687 B2 * | 3/2018 | Wang | ................... H04L 5/0048 |
| 10,057,039 B2 | 8/2018 | Seo et al. | |
| 10,419,099 B2 | 9/2019 | Ren et al. | |
| 10,476,650 B2 | 11/2019 | Yang et al. | |
| 10,568,048 B2 * | 2/2020 | Stern-Berkowitz | ........................ H04L 27/2613 |
| 10,834,625 B2 | 11/2020 | Vintola et al. | |
| 10,939,386 B2 * | 3/2021 | Yao | ..................... H04W 52/146 |
| 11,277,760 B2 * | 3/2022 | Kusashima | ............ H04B 7/086 |
| 11,419,063 B2 * | 8/2022 | Stern-Berkowitz | ........................ H04L 27/2613 |
| 11,540,231 B2 * | 12/2022 | Yao | ................... H04W 56/0005 |
| 11,546,811 B2 | 1/2023 | Xu et al. | |
| 2012/0149411 A1 | 6/2012 | Miyoshi et al. | |
| 2012/0214528 A1 | 8/2012 | Hashimoto et al. | |
| 2013/0272257 A1 | 10/2013 | Takaoka et al. | |
| 2015/0049736 A1 | 2/2015 | Liu et al. | |
| 2020/0033849 A1 | 1/2020 | Yiu et al. | |

FOREIGN PATENT DOCUMENTS

| | | |
|---|---|---|
| CN | 102356675 | 2/2012 |
| CN | 103905104 | 7/2014 |
| CN | 107484251 | 12/2017 |
| CN | 108023623 | 5/2018 |
| CN | 108092755 | 5/2018 |
| CN | 108271175 | 7/2018 |
| EP | 2663136 | 11/2013 |
| WO | 2014058363 | 4/2014 |
| WO | 2018028393 | 2/2018 |

OTHER PUBLICATIONS

3GPP TS 38.211 V15.3.0 (Sep. 2018), "3rd Generation Partnership Project; Technical Specification Group Radio Access Network; NR; Physical channels and modulation (Release 15)," Sep. 2018, 96 pages.

3GPP TS 38.212 V15.3.0 (Sep. 2018), "3rd Generation Partnership Project; Technical Specification Group Radio Access Network; NR; Multiplexing and channel coding(Release 15)," Sep. 2018, 99 pages.

3GPP TS 38.213 V15.2.0, "3rd Generation Partnership Project; Technical Specification Group Radio Access Network; NR; Physical layer procedures for control (Release 15)," Jun. 2018, 99 pages.

3GPP TS 38.214 V15.2.0 (Jun. 2018), "3rd Generation Partnership Project; Technical Specification Group Radio Access Network; NR; Physical layer procedures for data (Release 15)," Jun. 2018, 95 pages.

3GPP TS 38.306 V15.2.0 (Jun. 2018), "3rd Generation Partnership Project; Technical Specification Group Radio Access Network; NR; User Equipment (UE) radio access capabilities(Release 15)," Jun. 2018, 28 pages.

Ericsson, "PUSCH power scaling in UL power control," 3GPP TSG RAN WG1 Meeting #93, R1-1807267, Busan, Korea, May 21-25, 2018, 9 pages.

Extended European Search Report issued in European Application No. 19868144.7 on Oct. 29, 2021, 7 pages.

Motorola, "SRS transmissions for multiple transmit antenna uplink" 3GPP TSG RAN WG1 Meeting #62, R1-104712, Madrid, Spain, Aug. 23-27, 2010, 2 pages.

Office Action issued in Chinese Application No. 201811152760.9 on Aug. 19, 2020, 14 pages (with English translation).

Office Action issued in Chinese Application No. 201811152760.9 on Jul. 13, 2021, 6 pages (with English translation).

Office Action issued in Chinese Application No. 201811152760.9 on Mar. 11, 2021, 16 pages (with English translation).

PCT International Search Report and Written Opinion issued in International Application No. PCT/CN2019/109100 on Dec. 27, 2019, 13 pages (with English translation).

* cited by examiner

POWER INDICATION METHOD AND APPARATUS

CROSS-REFERENCE TO RELATED APPLICATIONS

This application is a continuation of U.S. patent application Ser. No. 17/215,561, filed on Mar. 29, 2021, which is a continuation of International Application No. PCT/CN2019/109100, filed on Sep. 29, 2019, which claims priority to Chinese Patent Application No. 201811152760.9, filed on Sep. 29, 2018. All of the afore-mentioned patent applications are hereby incorporated by reference in their entireties.

TECHNICAL FIELD

This application relates to the field of communications technologies, and in particular, to a power indication method and an apparatus.

BACKGROUND

In a process in which a terminal performs uplink transmission, a base station needs to perform power control on the terminal, so as to: avoid extremely low transmit power of the terminal and ensure quality of uplink data sent by the terminal; and avoid extremely high transmit power of the terminal and prevent interference to another terminal in a network.

Currently, a terminal reports a power class (power classes) of the terminal to a network device, so that the network device performs power control on the terminal for uplink transmission. The power class defines a maximum transmit power value of the terminal that can be allowed by a network system in a same time unit on each frequency band. However, the network device cannot effectively perform power control on the terminal for uplink transmission only based on the power class reported by the terminal.

SUMMARY

This application provides a power indication method and apparatus, so that a network device can effectively perform power control on a terminal for uplink transmission, to ensure reliability of uplink transmission.

To achieve the foregoing objective, this application provides the following technical solutions:

According to a first aspect, a power indication method is provided, including: A terminal generates antenna transmit capability information, where the antenna transmit capability information is used to indicate whether a maximum transmit power value of each transmit antenna port of the terminal reaches a preset power value, or the antenna transmit capability information is used to indicate a maximum transmit power value of each transmit antenna port of the terminal; and the terminal sends the antenna transmit capability information to a network device. Based on the foregoing technical solution, the network device may learn of power of each transmit antenna port of the terminal. In this way, when scheduling uplink transmission, the network device determines that a transmit power value that can be used by the terminal matches a transmit power value that is actually used by the terminal to perform uplink transmission, so as to ensure receiving performance of the network device.

In a possible design, the antenna transmit capability information includes at least one of the following information: (1) an antenna configuration type, where the antenna configuration type is used to indicate a quantity of transmit antenna ports configured for the terminal, and a maximum transmit power value of each transmit antenna port; (2) a maximum transmit power value of each transmit antenna port; (3) a quantity of transmit antenna ports configured for the terminal and a quantity of transmit antenna ports whose maximum transmit power value reaches a preset power value; or (4) power indication information of each transmit antenna port, where the power indication information is used to indicate whether a maximum transmit power value of the transmit antenna port reaches a preset power value.

In a possible design, the transmit antenna port is represented by using sounding reference signal (sounding reference signal, SRS) port information; or the transmit antenna port is represented by using SRS port information in combination with group information of a transmit antenna group.

In a possible design, the transmit antenna port is configured to send a PUSCH.

According to a second aspect, a power indication method is provided, including: A network device receives antenna transmit capability information sent by a terminal, where the antenna transmit capability information is used to indicate whether a maximum transmit power value of each transmit antenna port of the terminal reaches a preset power value, or the antenna transmit capability information is used to indicate a maximum transmit power value of each transmit antenna port of the terminal; and the network device determines, based on the antenna transmit capability information, whether the maximum transmit power value of each transmit antenna port of the terminal reaches the preset power value. Based on the foregoing technical solution, the network device may determine power of each transmit antenna port of the terminal. In this way, when scheduling uplink transmission, the network device determines that a transmit power value that can be used by the terminal matches a transmit power value that is actually used by the terminal to perform uplink transmission, so as to ensure receiving performance of the network device.

In a possible design, the antenna transmit capability information includes at least one of the following information: (1) an antenna configuration type, where the antenna configuration type is used to indicate a quantity of transmit antenna ports configured for the terminal, and a maximum transmit power value of each transmit antenna port; (2) a maximum transmit power value of each transmit antenna port; (3) a quantity of transmit antenna ports configured for the terminal and a quantity of transmit antenna ports whose maximum transmit power value reaches a preset power value; or (4) power indication information of each transmit antenna port, where the power indication information is used to indicate whether a maximum transmit power value of the transmit antenna port reaches a preset power value.

In a possible design, the transmit antenna port is represented by using SRS port information; or the transmit antenna port is represented by using SRS port information in combination with group information of a transmit antenna group.

In a possible design, the transmit antenna port is configured to send a PUSCH.

According to a third aspect, a terminal is provided, including: a processing module, configured to generate antenna transmit capability information, where the antenna transmit capability information is used to indicate whether a maximum transmit power value of each transmit antenna port of the terminal reaches a preset power value, or the antenna transmit capability information is used to indicate a maximum transmit power value of each transmit antenna port of the terminal; and a communications module, configured to send the antenna transmit capability information to a network device.

In a possible design, the antenna transmit capability information includes at least one of the following information: (1) an antenna configuration type, where the antenna configuration type is used to indicate a quantity of transmit antenna ports configured for the terminal, and a maximum transmit power value of each transmit antenna port; (2) a maximum transmit power value of each transmit antenna port; (3) a quantity of transmit antenna ports configured for the terminal and a quantity of transmit antenna ports whose maximum transmit power value reaches a preset power value; or (4) power indication information of each transmit antenna port, where the power indication information is used to indicate whether a maximum transmit power value of the transmit antenna port reaches a preset power value.

In a possible design, the transmit antenna port is represented by using SRS port information; or the transmit antenna port is represented by using SRS port information in combination with group information of a transmit antenna group.

In a possible design, the transmit antenna port is configured to send a PUSCH.

According to a fourth aspect, a terminal is provided, including: a processor, configured to generate antenna transmit capability information, where the antenna transmit capability information is used to indicate whether a maximum transmit power value of each transmit antenna port of the terminal reaches a preset power value, or the antenna transmit capability information is used to indicate a maximum transmit power value of each transmit antenna port of the terminal; and a communications interface, configured to send the antenna transmit capability information to a network device.

In a possible design, the antenna transmit capability information includes at least one of the following information: (1) an antenna configuration type, where the antenna configuration type is used to indicate a quantity of transmit antenna ports configured for the terminal, and a maximum transmit power value of each transmit antenna port; (2) a maximum transmit power value of each transmit antenna port; (3) a quantity of transmit antenna ports configured for the terminal and a quantity of transmit antenna ports whose maximum transmit power value reaches a preset power value; or (4) power indication information of each transmit antenna port, where the power indication information is used to indicate whether a maximum transmit power value of the transmit antenna port reaches a preset power value.

In a possible design, the transmit antenna port is represented by using SRS port information; or the transmit antenna port is represented by using SRS port information in combination with group information of a transmit antenna group.

In a possible design, the transmit antenna port is configured to send a PUSCH.

According to a fifth aspect, a terminal is provided, including a processor, where the processor is configured to: couple to a memory, read an instruction in the memory, and implement the power indication method in any one of the first aspect according to the instruction.

According to a sixth aspect, a computer-readable storage medium is provided, where the computer-readable storage medium stores an instruction, and when the computer-readable storage medium runs on a computer, the computer may perform the power indication method in any one of the first aspect.

According to a seventh aspect, a computer program product that includes an instruction is provided, where when the computer program product runs on a computer, the computer may perform the power indication method in any one of the first aspect.

According to an eighth aspect, a chip system is provided, where the chip system includes a processor, configured to support a terminal in implementing a function of the power indication method in any one of the first aspect. In a possible design, the chip system further includes a memory, and the memory is configured to store a program instruction and data that are necessary for the terminal. The chip system may include a chip, or include a chip and another discrete device.

For technical effects brought by any design manner of the third aspect to the eighth aspect, refer to technical effects brought by different design manners of the first aspect. Details are not described herein again.

According to a ninth aspect, a network device is provided, including: a communications module, configured to receive antenna transmit capability information sent by a terminal, where the antenna transmit capability information is used to indicate whether a maximum transmit power value of each transmit antenna port of the terminal reaches a preset power value, or the antenna transmit capability information is used to indicate a maximum transmit power value of each transmit antenna port of the terminal; and a processing module, configured to determine, based on the antenna transmit capability information, whether the maximum transmit power value of each transmit antenna port of the terminal reaches the preset power value.

In a possible design, the antenna transmit capability information includes at least one of the following information: (1) an antenna configuration type, where the antenna configuration type is used to indicate a quantity of transmit antenna ports configured for the terminal, and a maximum transmit power value of each transmit antenna port; (2) a maximum transmit power value of each transmit antenna port; (3) a quantity of transmit antenna ports configured for the terminal and a quantity of transmit antenna ports whose maximum transmit power value reaches a preset power value; or (4) power indication information of each transmit antenna port, where the power indication information is used to indicate whether a maximum transmit power value of the transmit antenna port reaches a preset power value.

In a possible design, the transmit antenna port is represented by using SRS port information; or the transmit antenna port is represented by using SRS port information in combination with group information of a transmit antenna group.

In a possible design, the transmit antenna port is configured to send a PUSCH.

According to a tenth aspect, a network device is provided, including: a communications interface, configured to receive antenna transmit capability information sent by a terminal, where the antenna transmit capability information is used to indicate whether a maximum transmit power value of each transmit antenna port of the terminal reaches a preset power value, or the antenna transmit capability information is used to indicate a maximum transmit power value of each transmit antenna port of the terminal; and a processor, configured to determine, based on the antenna transmit capability information, whether the maximum transmit power value of each transmit antenna port of the terminal reaches the preset power value.

In a possible design, the antenna transmit capability information includes at least one of the following information: (1) an antenna configuration type, where the antenna configuration type is used to indicate a quantity of transmit antenna ports configured for the terminal, and a maximum transmit power value of each transmit antenna port; (2) a maximum transmit power value of each transmit antenna port; (3) a quantity of transmit antenna ports configured for the terminal and a quantity of transmit antenna ports whose maximum transmit power value reaches a preset power value; or (4) power indication information of each transmit antenna port, where the power indication information is used to indicate whether a maximum transmit power value of the transmit antenna port reaches a preset power value.

In a possible design, the transmit antenna port is represented by using SRS port information; or the transmit antenna port is represented by using SRS port information in combination with group information of a transmit antenna group.

In a possible design, the transmit antenna port is configured to send a PUSCH.

According to an eleventh aspect, a network device is provided, including a processor, where the processor is configured to: couple to a memory, read an instruction in the memory, and implement the power indication method in any one of the second aspect according to the instruction.

According to a twelfth aspect, a computer-readable storage medium is provided, where the computer-readable storage medium stores an instruction, and when the computer-readable storage medium runs on a computer, the computer may perform the power indication method in any one of the second aspect.

According to a thirteenth aspect, a computer program product that includes an instruction is provided, where when the computer program product runs on a computer, the computer may perform the power indication method in any one of the second aspect.

According to a fourteenth aspect, a chip system is provided, where the chip system includes a processor, configured to support a network device in implementing a function of the power indication method in any one of the second aspect. In a possible design, the chip system further includes a memory, and the memory is configured to store a program instruction and data that are necessary for the network device. The chip system may include a chip, or include a chip and another discrete device.

For technical effects brought by any design manner of the ninth aspect to the fourteenth aspect, refer to technical effects brought by different design manners of the second aspect. Details are not described herein again.

DESCRIPTION OF EMBODIMENTS

Figure 1:
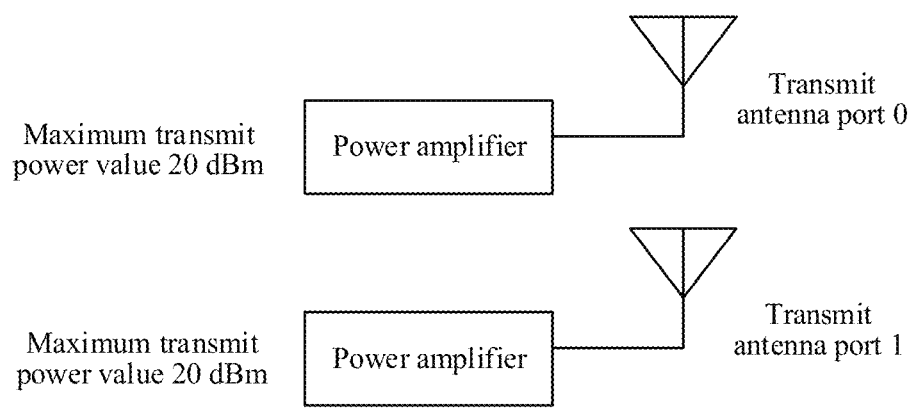
FIG. 1 is a schematic diagram of antenna configuration of a terminal.

The following first briefly describes some concepts involved in the embodiments of this application.

In a new radio access technology (new radio access technology, NR) system of the 3rd Generation Partnership Project (3rd generation partnership project, 3GPP), a downlink resource of the system is divided into a plurality of orthogonal frequency division multiplexing (orthogonal frequency division multiple, OFDM) symbols in terms of time, and is divided into several subcarriers in terms of frequency. A physical downlink control channel (physical downlink control channel, PDCCH) in a downlink usually occupies the first two or three OFDM symbols in a subframe. The PDCCH is used to carry downlink control information (downlink control information, DCI). The DCI carries UE-specific resource allocation and other control information that is UE-specific or cell-shared. A physical uplink shared channel (physical uplink shared channel, PUSCH) in an uplink of the system is used to carry data for uplink sending. Usually, discrete Fourier transform spread OFDM (DFT-Spread OFDM, DFT-S-OFDM) is used to generate a frequency domain signal. Uplink transmission of NR supports two types of waveforms. For a power-limited scenario, a DFT-s-OFDM waveform is usually used, and the waveform supports data transmission of a single stream at most and ensures a single carrier characteristic. For a resource-limited scenario, a cyclic prefix OFDM (cycle prefix OFDM, CP-OFDM) waveform is usually used, and the waveform supports single-stream or multi-stream data transmission to improve spectrum efficiency of a communications system.

Before uplink transmission, a terminal reports a quantity of transmit antenna ports (for example, 1Tx, 2Tx, or 4Tx) that can be supported by the terminal. The quantity of transmit antenna ports may represent a maximum quantity of transport layers of uplink transmission. In addition, the quantity of transmit antenna ports also corresponds to a dimension of a precoding matrix that is indicated by DCI and that is used for current uplink transmission in codebook-based uplink transmission. That is, a quantity of rows of the precoding matrix represents a quantity of transmit antenna ports used for the current uplink transmission, and the quantity of rows is less than or equal to the quantity of transmit antenna ports that can be supported by the terminal. A quantity of columns of the precoding matrix represents the quantity of transport layers and is less than or equal to the quantity of transmit antenna ports that can be supported by the terminal. For example, for a terminal having 2Tx, a maximum quantity of transmit antenna ports used for uplink transmission is 2, and a maximum quantity of transport layers used for uplink transmission is 2. The transmit antenna port may be corresponding to a physical antenna port of the terminal, or a logical antenna port obtained after a physical antenna of the terminal is virtualized. Each transmit antenna port may be corresponding to one power amplifier (power amplifier, PA).

Further, the quantity of supported transmit antenna ports reported by the terminal also corresponds to a quantity of antenna ports in an SRS resource (that is, a quantity of SRS ports) transmitted based on a codebook, and the quantity of antenna ports in the SRS resource is usually less than or equal to the quantity of supported transmit antenna ports reported by the terminal. Antenna ports in each SRS resource may be in a one-to-one correspondence with transmit antenna ports used for uplink transmission, that is, an antenna port in each SRS resource is corresponding to one PA. For example, for a terminal having 2Tx, a quantity of SRS ports may be configured as 2, and a maximum quantity of transport layers is 2.

The terminal further reports a maximum coherent capability between antennas. For example, for a terminal having 2Tx, a coherent capability includes a full-coherent (full-coherent) capability and a non-coherent (non-coherent) capability. For a terminal having 4Tx, a coherent capability includes a full-coherent capability, a partial-coherent (partial-coherent) capability, and a non-coherent capability.

The full-coherent capability is used to indicate that all transmit antenna ports of a terminal for uplink transmission can complete phase alignment and perform phase weighting, that is, all the transmit antenna ports of the terminal can be used to send data of a same transport layer.

The partial-coherent capability is used to indicate that there are two groups of transmit antenna ports in transmit antenna ports of a terminal used for uplink transmission. In addition, intra-group transmit antenna ports complete phase alignment, and can perform phase weighting to send data of a same transport layer. However, inter-group transmit antenna ports do not complete phase alignment, and cannot perform phase weighting. In addition, data of a same transport layer can only be transmitted by using one group of transmit antenna ports.

The non-coherent capability means that phase alignment is not completed among all transmit antenna ports of a terminal. Therefore, all the transmit antenna ports of the terminal cannot be used to perform phase weighting and send data of a same transport layer, that is, data of one transport layer can only be sent by using one transmit antenna port of all the transmit antenna ports.

correspond to the non-coherent capability, and codewords whose TPMI index values are 2-5 correspond to the full-coherent capability. For another example, in Table 2, a codeword whose TPMI index value is 0 corresponds to the non-coherent capability, and codewords whose TPMI index values are 1-2 correspond to the full-coherent capability. For another example, in Table 3, codewords whose TPMI index values are 0-3 correspond to the non-coherent capability, codewords whose TPMI index values are 4-11 correspond to the partial-coherent capability, and codewords whose TPMI index values are 12-27 correspond to the full-coherent capability. For another example, in Table 4, codewords whose TPMI index values are 0-3 correspond to the non-coherent capability, codewords whose TPMI index values are 4-11 correspond to the partial-coherent capability, and codewords whose TPMI index values are 12-27 correspond to the full-coherent capability. For another example, in Table 5, codewords whose TPMI index values are 0-5 correspond to the non-coherent capability, codewords whose TPMI index values are 6-13 correspond to the partial-coherent capability, and codewords whose TPMI index values are 14-21 correspond to the full-coherent capability. For another example, in Table 6, a codeword whose TPMI index value is 0 corresponds to the non-coherent capability, codewords whose TPMI index values are 1-2 correspond to the partial-coherent capability, and codewords whose TPMI index values are 3-6 correspond to the full-coherent capability. For another example, in Table 7, a codeword whose TPMI index value is 0 correspond to the non-coherent capability, codewords whose TPMI index values are 1-2 correspond to the partial-coherent capability, and codewords whose TPMI index values are 3-4 correspond to the full-coherent capability.

TABLE 1

Precoding matrix W for one-layer transmission of two transmit antenna ports

| TPMI index | W |
|---|---|
| 0-5 | $\frac{1}{\sqrt{2}}\begin{bmatrix}1\\0\end{bmatrix}$  $\frac{1}{\sqrt{2}}\begin{bmatrix}0\\1\end{bmatrix}$  $\frac{1}{\sqrt{2}}\begin{bmatrix}1\\1\end{bmatrix}$  $\frac{1}{\sqrt{2}}\begin{bmatrix}1\\-1\end{bmatrix}$  $\frac{1}{\sqrt{2}}\begin{bmatrix}1\\j\end{bmatrix}$  $\frac{1}{\sqrt{2}}\begin{bmatrix}1\\-j\end{bmatrix}$ — |

For example, codebooks pre-stored between a network device and a terminal may be shown in Table 1 to Table 7 below. Codewords in the codebook are arranged in ascending order of index values of transmission precoding matrix indicators (transmission precoding matrix indicator, TPMI) from left to right in the tables. One codebook may include three types of codewords, and each type of codeword corresponds to one coherent capability. For example, in Table 1, codewords whose TPMI index values are 0-1

TABLE 2

Precoding matrix W for two-layer transmission of two transmit antenna ports

| TPMI index | W |
|---|---|
| 0-2 | $\frac{1}{\sqrt{2}}\begin{bmatrix}1&0\\0&1\end{bmatrix}$  $\frac{1}{\sqrt{2}}\begin{bmatrix}1&1\\1&-1\end{bmatrix}$  $\frac{1}{\sqrt{2}}\begin{bmatrix}1&1\\j&-j\end{bmatrix}$ |

TABLE 3

Precoding matrix W for one-layer transmission of a DFT-s-OFDM waveform of four transmit antenna ports

| TPMI index | W |
|---|---|
| 0-7 | $\frac{1}{2}\begin{bmatrix}1\\0\\0\\0\end{bmatrix}$  $\frac{1}{2}\begin{bmatrix}0\\1\\0\\0\end{bmatrix}$  $\frac{1}{2}\begin{bmatrix}0\\0\\1\\0\end{bmatrix}$  $\frac{1}{2}\begin{bmatrix}0\\0\\0\\1\end{bmatrix}$  $\frac{1}{2}\begin{bmatrix}1\\0\\1\\0\end{bmatrix}$  $\frac{1}{2}\begin{bmatrix}1\\0\\-1\\0\end{bmatrix}$  $\frac{1}{2}\begin{bmatrix}1\\0\\j\\0\end{bmatrix}$  $\frac{1}{2}\begin{bmatrix}1\\0\\-j\\0\end{bmatrix}$ |

TABLE 3-continued

Precoding matrix W for one-layer transmission of a DFT-s-OFDM waveform of four transmit antenna ports

| TPMI index | W |
|---|---|
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ |

TABLE 4

Precoding matrix W for one-layer transmission of a CP-OFDM waveform of four transmit antenna ports

| TPMI index | W |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ |

TABLE 5

Precoding matrix W for two-layer transmission of a CP-OFDM waveform of four transmit antenna ports

| TPMI index | W |
|---|---|
| 0-3 | $\frac{1}{2}\begin{bmatrix}1&0\\0&1\\0&0\\0&0\end{bmatrix}$ $\frac{1}{2}\begin{bmatrix}1&0\\0&0\\0&1\\0&0\end{bmatrix}$ $\frac{1}{2}\begin{bmatrix}1&0\\0&0\\0&0\\0&1\end{bmatrix}$ $\frac{1}{2}\begin{bmatrix}0&0\\1&0\\0&1\\0&0\end{bmatrix}$ |

TABLE 5-continued

Precoding matrix W for two-layer transmission of a CP-OFDM waveform of four transmit antenna ports

| TPMI index | W |
|---|---|
| 4-7 | $\dfrac{1}{2}\begin{bmatrix} 0 & 0 \\ 1 & 0 \\ 0 & 0 \\ 0 & 1 \end{bmatrix}$  $\dfrac{1}{2}\begin{bmatrix} 0 & 0 \\ 0 & 0 \\ 1 & 0 \\ 0 & 1 \end{bmatrix}$  $\dfrac{1}{2}\begin{bmatrix} 1 & 0 \\ 0 & 1 \\ 1 & 0 \\ 0 & -j \end{bmatrix}$  $\dfrac{1}{2}\begin{bmatrix} 1 & 0 \\ 0 & 1 \\ 1 & 0 \\ 0 & j \end{bmatrix}$ |
| 8-11 | $\dfrac{1}{2}\begin{bmatrix} 1 & 0 \\ 0 & 1 \\ -j & 0 \\ 0 & 1 \end{bmatrix}$  $\dfrac{1}{2}\begin{bmatrix} 1 & 0 \\ 0 & 1 \\ -j & 0 \\ 0 & 1 \end{bmatrix}$  $\dfrac{1}{2}\begin{bmatrix} 1 & 0 \\ 0 & 1 \\ -1 & 0 \\ 0 & -j \end{bmatrix}$  $\dfrac{1}{2}\begin{bmatrix} 1 & 0 \\ 0 & 1 \\ -1 & 0 \\ 0 & j \end{bmatrix}$ |
| 12-15 | $\dfrac{1}{2}\begin{bmatrix} 1 & 0 \\ 0 & 1 \\ j & 0 \\ 0 & 1 \end{bmatrix}$  $\dfrac{1}{2}\begin{bmatrix} 1 & 0 \\ 0 & 1 \\ j & 0 \\ 0 & -1 \end{bmatrix}$  $\dfrac{1}{2\sqrt{2}}\begin{bmatrix} 1 & 1 \\ 1 & 1 \\ 1 & -1 \\ 1 & -1 \end{bmatrix}$  $\dfrac{1}{2\sqrt{2}}\begin{bmatrix} 1 & 1 \\ 1 & 1 \\ j & -j \\ j & -j \end{bmatrix}$ |
| 16-19 | $\dfrac{1}{2\sqrt{2}}\begin{bmatrix} 1 & 1 \\ j & j \\ 1 & -1 \\ j & -j \end{bmatrix}$  $\dfrac{1}{2\sqrt{2}}\begin{bmatrix} 1 & 1 \\ j & j \\ j & -j \\ -1 & 1 \end{bmatrix}$  $\dfrac{1}{2\sqrt{2}}\begin{bmatrix} 1 & 1 \\ -1 & -1 \\ 1 & -1 \\ -1 & 1 \end{bmatrix}$  $\dfrac{1}{2\sqrt{2}}\begin{bmatrix} 1 & 1 \\ -1 & -1 \\ j & -j \\ -j & j \end{bmatrix}$ |
| 20-21 | $\dfrac{1}{2\sqrt{2}}\begin{bmatrix} 1 & 1 \\ -j & -j \\ 1 & -1 \\ -j & j \end{bmatrix}$  $\dfrac{1}{2\sqrt{2}}\begin{bmatrix} 1 & 1 \\ -j & -j \\ j & -j \\ 1 & -1 \end{bmatrix}$  —  — |

TABLE 6

Precoding matrix W for three-layer transmission of a CP-OFDM waveform of four transmit antenna ports

| TPMI index | W |
|---|---|
| 0-3 | $\dfrac{1}{2}\begin{bmatrix} 1 & 0 & 0 \\ 0 & 1 & 0 \\ 0 & 0 & 1 \\ 0 & 0 & 0 \end{bmatrix}$  $\dfrac{1}{2}\begin{bmatrix} 1 & 0 & 0 \\ 0 & 1 & 0 \\ 1 & 0 & 0 \\ 0 & 0 & 1 \end{bmatrix}$  $\dfrac{1}{2}\begin{bmatrix} 1 & 0 & 0 \\ 0 & 1 & 0 \\ -1 & 0 & 0 \\ 0 & 0 & 1 \end{bmatrix}$  $\dfrac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\dfrac{1}{2\sqrt{3}}\begin{bmatrix} 1 & 1 & 1 \\ 1 & -1 & 1 \\ j & j & -j \\ j & -j & -j \end{bmatrix}$  $\dfrac{1}{2\sqrt{3}}\begin{bmatrix} 1 & 1 & 1 \\ -1 & 1 & -1 \\ 1 & 1 & -1 \\ -1 & 1 & -1 \end{bmatrix}$  $\dfrac{1}{2\sqrt{3}}\begin{bmatrix} 1 & 1 & 1 \\ -1 & 1 & -1 \\ j & j & -j \\ j & j & j \end{bmatrix}$  — |

TABLE 7

Precoding matrix W for four-layer transmission of a CP-OFDM waveform of four transmit antenna ports

| TPMI index | W |
|---|---|
| 0-3 | $\dfrac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$  $\dfrac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$  $\dfrac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$  $\dfrac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\dfrac{1}{4}\begin{bmatrix} 1 & 1 & 1 & 1 \\ 1 & -1 & 1 & -1 \\ j & j & -j & -j \\ j & -j & -j & j \end{bmatrix}$  —  —  — |

Before uplink transmission, a terminal sends an SRS on a corresponding time-frequency resource based on SRS resource configuration, and a base station receives and measures the SRS on the corresponding time-frequency resource to obtain uplink channel information. Based on the uplink channel information, the base station indicates, by using DCI carried on a PDCCH and used for scheduling uplink transmission, the terminal to send a PUSCH. The DCI indicates that transmission parameters of the PUSCH include a transmission rank indicator (transmission rank indicator, TRI) and a TPMI. It should be noted that the base station delivers a corresponding TPMI based on a maximum coherent capability reported by the terminal, to indicate a corresponding codeword. For example, if the maximum coherent capability reported by the terminal is full-coherent, the base station may indicate a codeword of a full-coherent type, a partial-coherent type, or a non-coherent type. For another example, if the maximum coherent capability reported by the terminal is partial-coherent, the base station may indicate a codeword of a partial-coherent type or a non-coherent type. For another example, if the maximum coherent capability reported by the terminal is non-coherent, the base station may indicate a codeword of a non-coherent type.

Optionally, the transmission parameters indicated by the DCI further include an SRS resource indication (SRS resource indication, SRI). Each SRS resource is corresponding to one transmit antenna group, and one transmit antenna group includes a plurality of transmit antenna ports. The SRI is used to indicate, from a plurality of SRS resources, an SRS resource to be used by the terminal, that is, the SRI is used to indicate a transmit antenna group that needs to be used by the terminal. Therefore, the terminal may transmit the PUSCH by using transmit antenna ports included in the transmit antenna group indicated by the SRI.

Each SRS port in the terminal is corresponding to one row of the foregoing precoding matrix, and an element in one row of the precoding matrix is a phase weighted coefficient of the corresponding SRS port. If values of elements in one row of the precoding matrix are all 0s, it indicates that the terminal does not need to send the PUSCH by using SRS ports corresponding to the row. In the embodiments of this application, the SRS port is a transmit antenna port used to transmit an SRS. In other words, the SRS port is a transmit antenna port that has SRS port information. There is a correspondence between SRS port information and a sequence number of a row in the precoding matrix. For example, the SRS port information may be an SRS port number, an SRS port identifier, or an SRS port index. Further, the SRS port information may further include another parameter related to the SRS port.

In the DCI, a field used to indicate a quantity of transport layers of the PUSCH and the TPMI is a precoding information and number of layers field, and each bit field index value of the field is corresponding to a quantity of transport layers and a corresponding TPMI. Table 8 shows an example of a precoding information and number of layers field in a case of four transmit antennas, a CP-OFDM waveform, and a maximum quantity of transport layers being 2 to 4. Table 9 shows an example of a precoding information and number of layers field in a case of four transmit antennas, a CP-OFDM waveform, and a maximum quantity of transport layers being 1.

TABLE 8

| Bit field index value | Full-coherent + partial-coherent + non-coherent | Bit field index value | Partial-coherent Non-coherent | Bit field index value | Non-coherent |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| ... | ... | ... | ... | ... | ... |
| 3 | One layer: TPMI = 3 | 3 | One layer: TPMI = 3 | 3 | One layer: TPMI = 3 |
| 4 | Two layers: TPMI = 0 | 4 | Two layers: TPMI = 0 | 4 | Two layers: TPMI = 0 |
| ... | ... | ... | ... | ... | ... |
| 9 | Two layers: TPMI = 5 | 9 | Two layers: TPMI = 5 | 9 | Two layers: TPMI = 5 |
| 10 | Three layers: TPMI = 0 | 10 | Three layers: TPMI = 0 | 10 | Three layers: TPMI = 0 |
| 11 | Four layers: TPMI = 0 | 11 | Four layers: TPMI = 0 | 11 | Four layers: TPMI = 0 |
| 12 | One layer: TPMI = 4 | 12 | One layer: TPMI = 4 | 12-15 | Reserved |
| ... | ... | ... | ... | | |
| 19 | One layer: TPMI = 11 | 19 | One layer: TPMI = 11 | | |
| 20 | Two layers: TPMI = 6 | 20 | Two layers: TPMI = 6 | | |
| ... | ... | ... | ... | | |
| 27 | Two layers: TPMI = 13 | 27 | Two layers: TPMI = 13 | | |
| 28 | Three layers: TPMI = 1 | 28 | Three layers: TPMI = 1 | | |
| 29 | Three layers: TPMI = 2 | 29 | Three layers: TPMI = 2 | | |
| 30 | Four layers: TPMI = 1 | 30 | Four layers: TPMI = 1 | | |
| 31 | Four layers: TPMI = 2 | 31 | Four layers: TPMI = 2 | | |
| 32 | One layer: TPMI = 12 | | | | |
| ... | ... | | | | |
| 47 | One layer: TPMI = 27 | | | | |
| 48 | Two layers: TPMI = 14 | | | | |
| ... | ... | | | | |
| 55 | Two layers: TPMI = 21 | | | | |
| 56 | Three layers: TPMI = 3 | | | | |
| ... | ... | | | | |
| 59 | Three layers: TPMI = 6 | | | | |
| 60 | Four layers: TPMI = 3 | | | | |
| 61 | Four layers: TPMI = 4 | | | | |
| 62-63 | Reserved | | | | |

TABLE 9

| Bit field index value | Full-coherent + partial-coherent + non-coherent | Bit field index value | Partial-coherent Non-coherent | Bit field index value | Non-coherent |
|---|---|---|---|---|---|
| 0 | One layer: TPMI = 0 | 0 | One layer: TPMI = 0 | 0 | One layer: TPMI = 0 |
| 1 | One layer: TPMI = 1 | 1 | One layer: TPMI = 1 | 1 | One layer: TPMI = 1 |
| ... | ... | ... | ... | ... | ... |
| 3 | One layer: TPMI = 3 | 3 | One layer: TPMI = 3 | 3 | One layer: TPMI = 3 |
| 4 | One layer: TPMI = 4 | 4 | One layer: TPMI = 4 | | |

TABLE 9-continued

| Bit field index value | Full-coherent + partial-coherent + non-coherent | Bit field index value | Partial-coherent Non-coherent | Bit field index value | Non-coherent |
|---|---|---|---|---|---|
| ... | ... | ... | ... | | |
| 11 | One layer: TPMI = 11 | 11 | One layer: TPMI = 11 | | |
| 12 | One layer: TPMI = 12 | 12-15 | Reserved | | |
| ... | ... | | | | |
| 27 | One layer: TPMI = 27 | | | | |
| 28-31 | Reserved | | | | |

The power class defines a maximum transmit power value of the terminal that can be allowed by a network system in a same time unit on each frequency band. Table 10 shows an example of a power class of the terminal.

TABLE 10

| EUTRA band | Class 2 (dBm) | Tolerance (dB) | Class 3 (dBm) | Tolerance (dB) |
|---|---|---|---|---|
| n1 | | | 23 | ±2 |
| n2 | | | 23 | ±23 |
| n8 | | | 23 | ±23 |
| n12 | | | 23 | ±23 |
| n25 | | | 23 | ±2 |
| n34 | | | 23 | ±2 |
| n39 | | | 23 | ±2 |
| n40 | | | 23 | ±2 |
| n41 | 26 | +2/−33 | 23 | ±23 |
| n66 | | | 23 | ±2 |
| n70 | | | 23 | ±2 |
| n71 | | | 23 | +2/−2.5 |
| n77 | 26 | +2/−3 | 23 | +2/−3 |
| n78 | 26 | +2/−3 | 23 | +2/−3 |
| n79 | 26 | +2/−3 | 23 | +2/−3 |
| n80 | | | 23 | ±2 |
| n81 | | | 23 | ±2 |
| n82 | | | 23 | ±2 |
| n83 | | | 23 | ±2/−2.5 |
| n84 | | | 23 | ±2 |
| n86 | | | 23 | ±2 |

It should be noted that the power class can reflect only a maximum transmit power value of the terminal, and cannot reflect a maximum transmit power value of each transmit antenna port in the terminal. For example, for a Class 3 terminal, there are at least two types of antenna configuration:

Configuration 1: As shown in FIG. 1, two power amplifiers configured for a terminal have a maximum transmit power of 20 dBm, that is, maximum transmit power values of transmit antenna ports corresponding to the two power amplifiers are 20 dBm. Two transmit antenna ports may be virtualized as one transmit antenna port, and a maximum transmit power value of the virtualized transmit antenna port is 23 dBm. That is, the maximum transmit power value of the terminal is 23 dBm.

Figure 2:
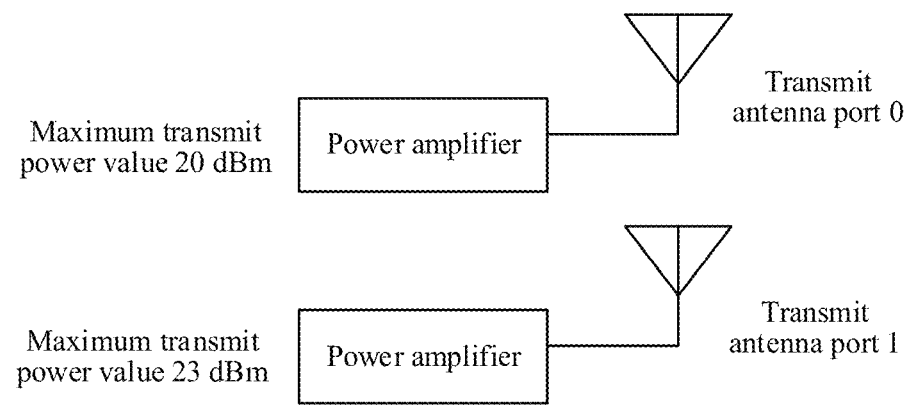
FIG. 2 is a schematic diagram of another antenna configuration of a terminal.

Configuration 2: As shown in FIG. 2, a power amplifier configured for a terminal has a maximum transmit power of 20 dbm, that is, a maximum transmit power value of a transmit antenna port 0 corresponding to the power transmitter is 20 dBm. Another power amplifier of the terminal has a maximum transmit power of 23 dbm, that is, a maximum transmit power value of a transmit antenna port 1 corresponding to the power transmitter is 23 dBm.

To effectively perform power control on uplink transmission of a terminal, an embodiment of this application provides a power indication method, including: A terminal generates antenna transmit capability information, where the antenna transmit capability information is used to indicate whether a maximum transmit power value of each transmit antenna port of the terminal reaches a preset power value, or the antenna transmit capability information is used to indicate a maximum transmit power value of each transmit antenna port of the terminal. Then, the terminal sends the antenna transmit capability information to a network device. The network device determines, based on the antenna transmit capability information, whether the maximum transmit power value of each transmit antenna port of the terminal reaches the preset power value (which may be directly determined based on the antenna transmit capability information; or the maximum transmit power value of each transmit antenna port of the terminal is first determined based on the antenna transmit capability information, and then whether the maximum transmit power value of each transmit antenna port of the terminal reaches the preset power value is determined based on the learned maximum transmit power value of each transmit antenna port). In this way, when performing uplink scheduling, the network device comprehensively considers power of each transmit antenna port of the terminal, so that the network device indicates the terminal to perform uplink transmission by using a proper transmit antenna port, thereby ensuring system transmission performance.

For example, with reference to FIG. 2, it is assumed that the network device expects the terminal to perform uplink transmission at a channel transmit power of 22 dBm. If the network device performs power control on uplink transmission only based on a power class reported by the terminal, the network device may indicate the terminal to perform uplink transmission by using a precoding matrix corresponding to a TPMI index value 0 in the codebook shown in Table 1. When the terminal performs uplink transmission by using the precoding matrix, actually, the terminal uses only the transmit antenna port 0 to perform uplink transmission. A maximum transmit power value of the transmit antenna port 0 is 20 dBm, and is less than 22 dBm. That is, actual transmit power of the terminal cannot reach the channel transmit power. As a result, system transmission performance is affected. If the technical solution of this application is used, the network device can learn that the transmit power value of the transmit antenna port 0 of the terminal is 20 dBm, and the transmit power value of the transmit antenna port 1 is 23 dBm. In this way, the network device can comprehensively consider power of each transmit antenna port of the terminal, so as to indicate the terminal to select an optimal transmit antenna port for uplink transmission. With reference to this example, the network device may determine that the transmit antenna port 1 is the optimal transmit antenna port. Therefore, DCI delivered by the network device indicates the terminal to perform uplink transmission by using a precoding matrix corresponding to a TPMI index value 1 in the codebook shown in Table 1, that is, the network device indicates the terminal to perform uplink transmission by using the transmit antenna port 1.

In the description of this application, unless otherwise stated, "/" indicates "or", for example, A/B may indicate A or B. The term "and/or" in this specification describes only an association relationship for associated objects and represents that three relationships may exist. For example, A and/or B may represent the following three cases: Only A exists, both A and B exist, and only B exists. In addition, "at least one" refers to one or more, and "plurality of" refers to two or more. Words such as "first" and "second" do not limit a quantity or an execution sequence, and words such as "first" and "second" do not mean being definitely different.

In the description of this application, the "indication" may include a direct indication and an indirect indication, or may include an explicit indication and an implicit indication. Information indicated by a piece of information (for example, antenna transmit capability information described below) is referred to as to-be-indicated information. In a specific implementation process, there are many manners of indicating the to-be-indicated information, including, but not limited to a following example: the to-be-indicated information may be directly indicated, for example, the to-be-indicated information itself or an index of the to-be-indicated information. Alternatively, the to-be-indicated information may be indirectly indicated by indicating other information, where there is an association relationship between the other information and the to-be-indicated information. Alternatively, only a part of the to-be-indicated information may be indicated, and another part of the to-be-indicated information is known or agreed upon in advance. For example, specific information may alternatively be indicated by using an arrangement order of all information that is agreed upon in advance (for example, specified in a protocol), thereby reducing indication overheads to some extent.

It should be noted that, in this application, the word "exemplary" or "for example" is used to represent giving an example, an illustration, or a description. Any embodiment or design scheme described as an "exemplary" or "for example" in this application should not be explained as being more preferred or having more advantages than another embodiment or design scheme. Exactly, use of the word "exemplary" or "example" or the like is intended to present a relative concept in a specific manner.

In addition, the network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

The technical solutions provided in the embodiments of this application may be applied to various communications systems, for example, a long term evolution (long term evolution, LTE) communications system, an NR communications system using a 5th generation (5th generation, 5G) communications technology, a future evolved system, or a plurality of communications fusion systems. The technical solutions provided in this application may be applied to a plurality of application scenarios, such as machine to machine (machine to machine, M2M), macro-micro communications, enhanced mobile broadband (enhance mobile broadband, eMBB), ultra-reliable and low latency communications (ultra-reliable & low latency communication, uRLLC), and massive machine type communication (massive machine type communication, mMTC).

Figure 3:
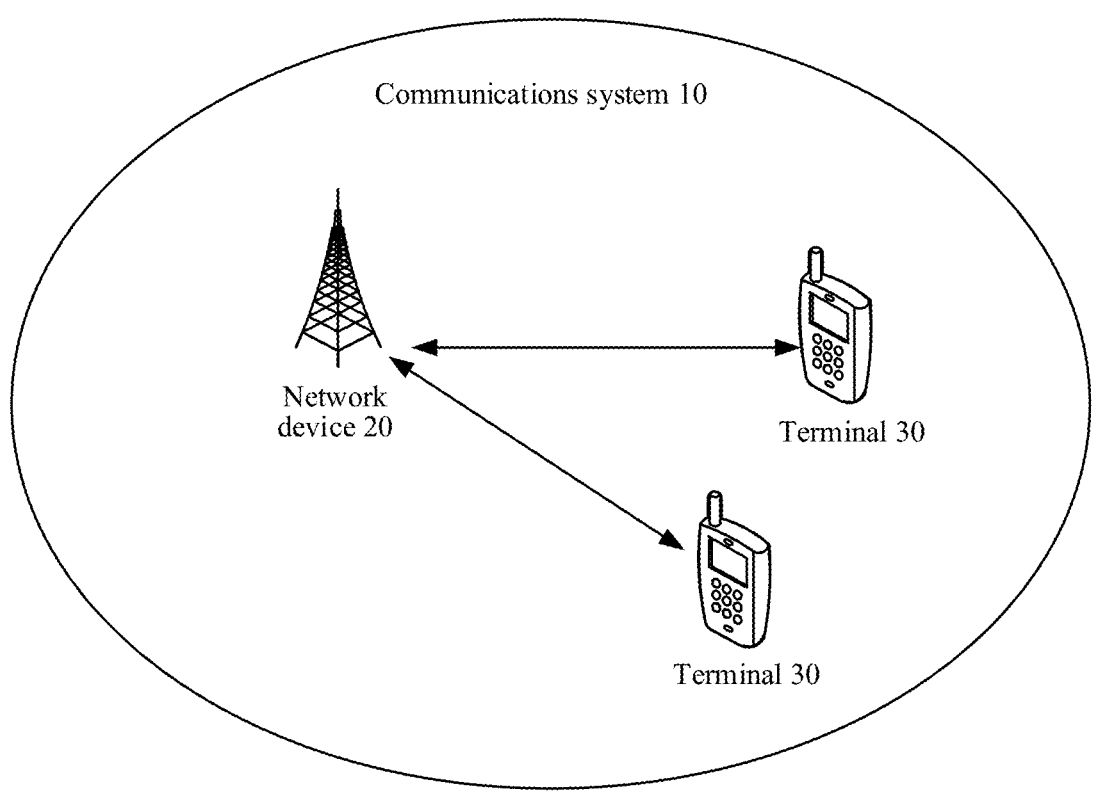
FIG. 3 is a schematic architectural diagram of a communications system according to an embodiment of this application.

FIG. 3 is a schematic diagram of a communications system to which the technical solutions provided in this application are applicable. A communications system 10 may include one or more network devices 20 (only one is shown) and one or more terminals 30 connected to each network device 20. FIG. 3 is only a schematic diagram, and does not constitute a limitation on an applicable scenario of the technical solutions provided in this application.

The network device 20 may be a base station, a base station controller, or the like for wireless communication. For example, the base station may include various types of base stations, for example, a micro base station (also referred to as a small cell), a macro base station, a relay node, and an access point. This is not specifically limited in the embodiments of this application. In the embodiments of this application, the base station may be a base transceiver station (base transceiver station, BTS) in a global system for mobile communications (global system for mobile communication, GSM) or code division multiple access (code division multiple access, CDMA), a NodeB (NodeB) in wideband code division multiple access (wideband code division multiple access, WCDMA), an evolved NodeB (evolutional NodeB, eNB or e-NodeB) in LTE, an eNB in an internet of things (internet of things, IoT) or narrow band-internet of things (narrow band-internet of things, NB-IoT), or a base station in a future 5G mobile communications network or a future evolved public land mobile network (public land Mobile Network, PLMN). This is not limited in the embodiments of this application.

The terminal 30 is configured to provide a voice and/or data connectivity service to a user. The terminal 30 may have different names, for example, user equipment (user equipment, UE), an access terminal, a terminal unit, a terminal station, a mobile station, a mobile console, a remote station, a remote terminal, a mobile device, a wireless communications device, a terminal agent, a terminal apparatus, or the like. Optionally, the terminal 30 may be various handheld devices, in-vehicle devices, wearable devices, and computers that have a communications function. This is not limited in the embodiments of this application. For example, the handheld device may be a smartphone. The in-vehicle device may be an in-vehicle navigation system. The wearable device may be a smart band. The computer may be a personal digital assistant (personal digital assistant, PDA) computer, a tablet computer, and a laptop computer (laptop computer).

Figure 4:
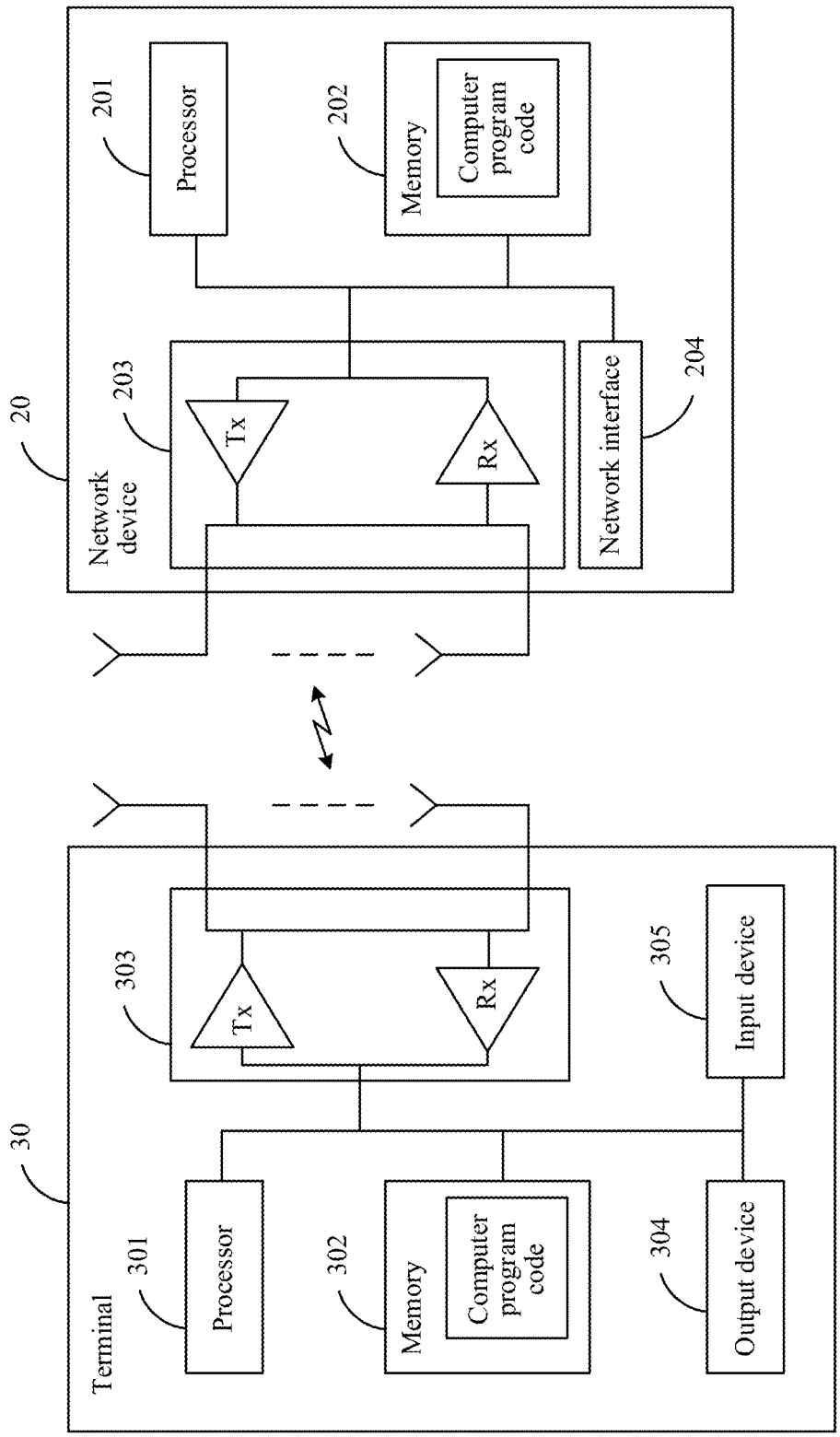
FIG. 4 is a schematic diagram of a hardware structure of a terminal and a network device according to an embodiment of this application.

FIG. 4 is a schematic diagram of a hardware structure of a network device 20 and a terminal 30 according to an embodiment of this application.

The terminal 30 includes at least one processor 301. Optionally, the terminal 30 further includes at least one memory 302 and at least one transceiver 303. Optionally, the terminal 30 may further include an output device 304 and an input device 305.

The processor 301, the memory 302, and the transceiver 303 are connected by using a bus. The processor 301 may be a general-purpose central processing unit (central processing unit, CPU), a microprocessor, an application-specific integrated circuit (application-specific integrated circuit, ASIC), or one or more integrated circuits for controlling program execution in the solution of this application. The processor 301 may also include a plurality of CPUs, and the processor 301 may be a single-core (single-CPU) processor or a multi-core (multi-CPU) processor. The processor herein may be one or more devices, circuits, or processing cores used for processing data (for example, a computer program instruction).

The memory 302 may be a read-only memory (read-only memory, ROM) or another type of static storage device capable of storing static information and instructions, a random access memory (random access memory, RAM) or another type of dynamic storage device capable of storing information and instructions, or may be an electrically erasable programmable read-only memory (electrically erasable programmable read-only memory, EEPROM), a compact disc read-only memory (compact disc read-only memory, CD-ROM), or other compact disc storage or optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer. This is not limited in the embodiments of this application. The memory 302 may exist independently and is connected to the processor 301 by using a bus. Alternatively, the memory 302 may be integrated with the processor 301. The memory 302 is configured to store application program code used for executing the solutions of this application, and the processor 301 controls the execution. The processor 301 is configured to execute computer program code stored in the memory 302, to implement method provided in the embodiment of this application.

The transceiver 303 may be a type of apparatus using any transceiver, and is configured to communicate with another device or a communications network, for example, an Ethernet, a radio access network (radio access network, RAN), or a wireless local area network (Wireless Local Area Network, WLAN). The transceiver 303 includes a transmitter Tx and a receiver Rx.

The output device 304 communicates with the processor 301, and may display information in a plurality of manners. For example, the output device 304 may be a liquid crystal display (liquid crystal display, LCD), a light emitting diode (light emitting diode, LED) display device, a cathode ray tube (cathode ray tube, CRT) display device, or a projector (projector). The input device 305 communicates with the processor 301, and may receive input of a user in a plurality of manners. For example, the input device 305 may be a mouse, a keyboard, a touchscreen device, or a sensing device.

The network device 20 includes at least one processor 201, and optionally, further includes at least one memory 202, at least one transceiver 203, and at least one network interface 204. The processor 201, the memory 202, the transceiver 203, and the network interface 204 are connected by using a bus. The network interface 204 is configured to connect to a core network device by using a link (for example, an S1 interface), or connect to a network interface of an access network device by using a wired or wireless link (for example, an X2 interface) (not shown in the figure). This is not specifically limited in the embodiments of this application. In addition, for descriptions about the processor 201, the memory 202, and the transceiver 203, refer to descriptions about the processor 301, the memory 302, and the transceiver 303 in the terminal 30. Details are not described again herein.

Figure 5:
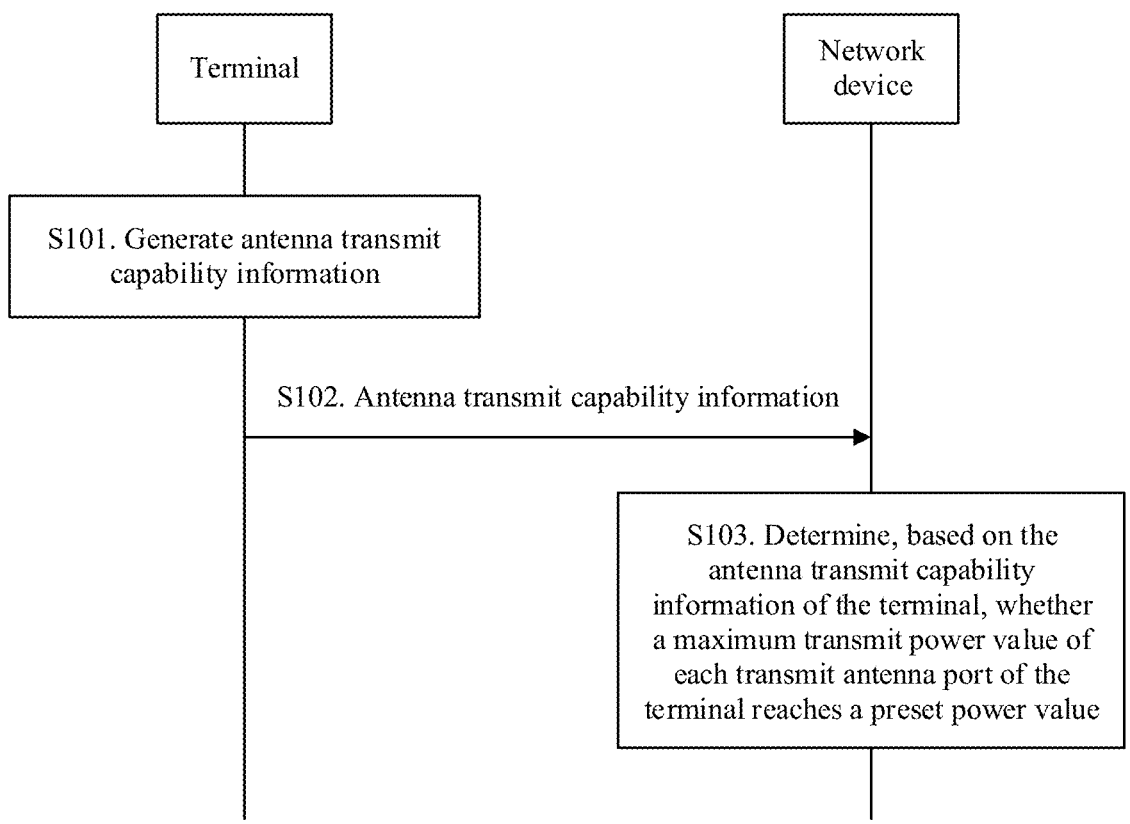
FIG. 5 is a flowchart of a power indication method according to an embodiment of this application.

FIG. 5 shows a power indication method according to an embodiment of this application. The method includes the following steps.

S101. A terminal generates antenna transmit capability information.

The antenna transmit capability information is used to indicate a maximum transmit power value of each transmit antenna port of the terminal. Alternatively, the antenna transmit capability information is used to indicate whether a maximum transmit power value of each transmit antenna port of the terminal reaches a preset power value. It should be noted that the preset power value may be predefined, or may be determined based on a power class of the terminal. For example, the preset power value is a maximum transmit power value corresponding to the power class reported by the terminal. Optionally, the terminal may report the preset power value to a network device, where the preset power value is less than or equal to the maximum transmit power value corresponding to the power class reported by the terminal, so that the network device learns of the preset power value.

It should be noted that a maximum transmit power value of a transmit antenna port is a maximum transmit power value of a PA corresponding to the transmit antenna port. Each PA is corresponding to one transmit chain (Tx chain)/transmit channel and a radio frequency (radio frequency, RF). Each transmit chain generates a respective transmit signal and amplifies power of the transmit signal by using the PA.

Optionally, the antenna transmit capability information includes at least one of the following information:

(1) Maximum transmit power value of each transmit antenna port. In actual application, the antenna transmit capability information may include an absolute value of the maximum transmit power value of each transmit antenna port, or may include a relative value of the maximum transmit power value of each transmit antenna port. For example, the relative value of the maximum transmit power value of the transmit antenna port may be a difference between the maximum transmit power value of the transmit antenna port and the preset power value. For another example, the relative value of the maximum transmit power value of the transmit antenna port may be a ratio of the maximum transmit power value of the transmit antenna port to the preset power value. The relative value of the maximum transmit power value of the transmit antenna port may be reported after a specific step is used for quantization.

(2) Power indication information of each transmit antenna port, where the power indication information is used to indicate whether the maximum transmit power value of the transmit antenna port reaches the preset power value. For example, the power indication information of the transmit antenna port may be represented by using one or more bits. For example, when values of the one or more bits are all 0s, it indicates that the maximum transmit power value of the transmit antenna port reaches the preset power value. When the values of the one or more bits are all 1s, it indicates that the maximum transmit power value of the transmit antenna port does not reach the preset power value.

(3) Antenna configuration type, where the antenna configuration type is used to indicate a quantity of transmit antenna ports configured for the terminal and a maximum transmit power value of each transmit antenna port. Optionally, the antenna configuration type of the terminal is predefined. For example, for a terminal having 2Tx, one or more of antenna configuration types may be predefined as follows: In antenna configuration type 1, a quantity of transmit antenna ports of the terminal is 2, and maximum transmit power values of the two transmit antenna ports are 20 dBm; in antenna configuration type 2, a quantity of transmit antenna ports configured for the terminal is 2, and maximum transmit power values of the two transmit antenna ports are 23 dBm; in antenna configuration type 3, a quantity of transmit antenna ports configured for the terminal is 2, where a maximum transmit power value of one transmit antenna port is 23 dBm, and a maximum transmit power value of the other transmit antenna port is 26 dBm; in antenna configuration type 4, a quantity of transmit antenna ports configured for the terminal is 2, where a maximum transmit power value of one transmit antenna port is 23 dBm, and a maximum transmit power value of the other transmit antenna port is 20 dBm; and in antenna configuration type 5, a quantity of transmit antenna ports configured for the terminal is 2, where a maximum transmit power value of one transmit antenna port is 26 dBm, and a maximum transmit power value of the other transmit antenna port is 26 dBm. A terminal of antenna configuration type 1, 2, or 4 may report Class 3 (maximum transmit power is 23 dBm), and a terminal of antenna configuration type 2, 3, or 5 may report Class 2 (maximum transmit power is 26 dBm).

Further, when the terminal is configured with a plurality of transmit antenna groups, the antenna configuration type is used to indicate a quantity of transmit antenna groups configured for the terminal, a quantity of transmit antenna ports included in each transmit antenna group, and a maximum transmit power value of each transmit antenna port in each transmit antenna group. For example, two transmit antenna groups are configured for a terminal of antenna configuration type 6, where a quantity of transmit antenna ports included in a transmit antenna group 1 is 2, a maximum transmit power value of one transmit antenna port is 23 dBm, and a maximum transmit power value of the other transmit antenna port is 26 dBm; and a quantity of transmit antenna ports included in a transmit antenna group 2 is 2, a maximum transmit power value of one transmit antenna port is 20 dBm, and a maximum transmit power value of the other transmit antenna port is 23 dBm.

(4) Quantity of transmit antenna ports configured for the terminal and quantity of transmit antenna ports whose maximum transmit power values reach the preset power value. For example, it is assumed that the preset power value is 23 dBm, and four transmit antenna ports are configured for the terminal, which are respectively a port 1, a port 2, a port 3,and a port 4. A maximum transmit power value of the port 1 is 20 dBm, a maximum transmit power value of the port 2 is 23 dBm, a maximum transmit power value of the port 3 is 20 dBm, and a maximum transmit power value of the port 4 is 26 dBm. Then, the quantity that is of transmit antenna ports configured for the terminal and that is included in the antenna transmit capability information reported by the terminal is 4, and the quantity of transmit antenna ports whose maximum transmit power values reach the preset power value is 2.

Further, when a plurality of transmit antenna groups are configured for the terminal, the antenna transmit capability information includes a quantity of transmit antenna ports in each transmit antenna group and a quantity of transmit antenna ports whose maximum transmit power values reach the preset power value, in each transmit antenna group.

Optionally, the transmit antenna port is represented by using SRS port information. Alternatively, when a plurality of transmit antenna groups are configured for the terminal, the transmit antenna port is represented by using SRS port information in combination with group information of the transmit antenna group. For example, the group information may be a group number, a group identifier, or a group index. Further, the group information may further include another parameter related to the transmit antenna group.

With reference to the antenna transmit capability information, the following describes how the network device and the terminal determine information about a transmit antenna group to which a transmit antenna port belongs.

In an example, the terminal may explicitly indicate, in the antenna transmit capability information, group information of a transmit antenna group to which each transmit antenna port belongs. For example, the antenna transmit capability information includes group information of a transmit antenna group to which each transmit antenna port belongs and a maximum transmit power value of each transmit antenna port. For another example, the antenna transmit capability information includes group information of a transmit antenna group to which each transmit antenna port belongs and power indication information of each transmit antenna port.

In an example, the terminal may alternatively implicitly indicate, in the antenna transmit capability information, SRS port information of each transmit antenna port and group information of a transmit antenna group to which each transmit antenna port belongs. For example, if the antenna transmit capability information includes a maximum transmit power value of each transmit antenna port, a position (or an arrangement order), of the maximum transmit power value of the transmit antenna port, in the antenna transmit capability information may be used to indicate group information of a transmit antenna group to which the transmit antenna port belongs. For another example, if the antenna transmit capability information includes power indication information of each transmit antenna port, a position (or an arrangement order), of the power indication information of the transmit antenna port, in the antenna transmit capability information may be used to indicate group information of a transmit antenna group to which the transmit antenna port belongs.

The following describes how the network device and the terminal determine the SRS port information of the transmit antenna port in combination with the antenna transmit capability information.

(1) The terminal pre-defines SRS port information of each transmit antenna port, and the terminal notifies the network device of the SRS port information by using the antenna transmit capability information.

In an example, the terminal may explicitly indicate, in the antenna transmit capability information, the SRS port information of each transmit antenna port. For example, the antenna transmit capability information includes the SRS port information and a maximum transmit power value of each transmit antenna port. For another example, the antenna transmit capability information includes the SRS port information and power indication information of each transmit antenna port.

In another example, the terminal may alternatively implicitly indicate, in the antenna transmit capability information, the SRS port information of each transmit antenna port. For example, if the antenna transmit capability information includes the maximum transmit power value of each transmit antenna port, a position, of the maximum transmit power value of the transmit antenna port, in the antenna transmit capability information may be used to indicate the SRS port information of the transmit antenna port. For another example, if the antenna transmit capability information includes the power indication information of each transmit antenna port, a position, of the power indication information of the transmit antenna port, in the antenna transmit capability information may be used to indicate the SRS port information of the transmit antenna port.

(2) The SRS port information of each transmit antenna port is determined between the terminal and the network device according to a preset rule. The preset rule is specified in a standard, or is delivered by the network device to the terminal.

In an example, the preset rule is as follows: For each transmit antenna group, SRS port information corresponding to each transmit antenna port in the transmit antenna group is determined based on a ranking of a maximum transmit power value of each transmit antenna port in the transmit antenna group.

For example, the antenna transmit capability information includes four maximum transmit power values, which are respectively 20 dBm, 20 dBm, 23 dBm, and 26 dBm. For the terminal, an SRS port number (in this example, the SRS port information is the SRS port number) corresponding to a transmit antenna port whose maximum transmit power value is 26 dBm is 0, and an SRS port number corresponding to a transmit antenna port whose maximum transmit power value is 23 dBm is 1. It is set that an SRS port number corresponding to a transmit antenna port whose maximum transmit power value is 20 dBm is 2, and an SRS port number corresponding to the other transmit antenna port whose maximum transmit power value is 20 dBm is 3. For the network device, the maximum transmit power value of the SRS port 0 is 23 dBm, the maximum transmit power value of the SRS port 1 is 23 dBm, and the maximum transmit power values of both the SRS port 2 and the SRS port 3 are 20 dBm.

In another example, the preset rule is as follows: For each antenna transmit group, a transmit antenna port whose maximum transmit power value reaches the preset power value corresponds to first SRS port information, and a transmit antenna port whose maximum transmit power value does not reach the preset power value corresponds to second SRS port information.

For each transmit antenna group, a quantity of first SRS port information is a quantity of transmit antenna ports whose maximum transmit power values reach the preset power value and included in the transmit antenna group, and a quantity of second SRS port information is equal to a quantity of transmit antenna ports included in the transmit antenna group minus the quantity of transmit antenna ports whose maximum transmit power values reach the preset power value and included in the transmit antenna group. A value set of the first SRS port information and a value set of the second SRS port information may be preset, or may be determined by the network device and the terminal through negotiation. This is not limited in this embodiment of this application. It may be understood that the network device may obtain, from the antenna transmit capability information, the quantity of transmit antenna ports included in each transmit antenna group and the quantity of transmit antenna ports whose maximum transmit power values reach the preset power value.

It may be understood that, when only one transmit antenna group is configured for the terminal, a quantity of transmit antenna ports included in the transmit antenna group is a quantity of transmit antenna ports configured for the terminal.

For example, the quantity of transmit antenna ports included in the transmit antenna group is 4, a quantity of transmit antenna ports whose maximum transmit power values reach the preset power value is 2, a value set of a first SRS port number (in this example, the SRS port information is the SRS port number) is {0, 1}, and a value set of a second SRS port number is {2, 3}. In this way, for the terminal, an SRS port number corresponding to one transmit antenna port whose maximum transmit power value reaches the preset power value is 0, an SRS port number corresponding to the other transmit antenna port whose maximum transmit power value reaches the preset power value is 1, an SRS port number corresponding to one transmit antenna port whose maximum transmit power value does not reach the preset power value is 2, and an SRS port number corresponding to the other transmit antenna port whose maximum transmit power value does not reach the preset power value is 3. For the network device, the maximum transmit power value of the SRS port 0 reaches the preset power value, the maximum transmit power value of the SRS port 1 reaches the preset power value, the maximum transmit power value of the SRS port 2 does not reach the preset power value, and the maximum transmit power value of the SRS port 2 does not reach the preset power value.

For another example, the quantity of transmit antenna ports included in the transmit antenna group is 4, a quantity of transmit antenna ports whose maximum transmit power values reach the preset power value is 2, a value set of a first SRS port number (in this example, the SRS port information is the SRS port number) is {0, 3}, and a value set of a second SRS port number is {1, 2}. In this way, for the terminal, an SRS port number corresponding to one transmit antenna port whose maximum transmit power value reaches the preset power value is 0, an SRS port number corresponding to the other transmit antenna port whose maximum transmit power value reaches the preset power value is 3, an SRS port number corresponding to one transmit antenna port whose maximum transmit power value does not reach the preset power value is 1, and an SRS port number corresponding to the other transmit antenna port whose maximum transmit power value does not reach the preset power value is 2. For the network device, the maximum transmit power value of the SRS port 0 reaches the preset power value, the maximum transmit power value of the SRS port 3 reaches the preset power value, the maximum transmit power value of the SRS port 1 does not reach the preset power value, and the maximum transmit power value of the SRS port 2 does not reach the preset power value.

S102. The terminal sends the antenna transmit capability information to the network device, so that the network device receives the antenna transmit capability information.

In an implementation, the terminal sends the antenna transmit capability information to the network device by using non-access stratum (non-access stratum, NAS) signaling.

Optionally, the terminal may actively send the antenna transmit capability information to the network device. Alternatively, after the network device requests the terminal for the antenna transmit capability information, the terminal sends the antenna transmit capability information to the network device.

S103. The network device determines, based on the antenna transmit capability information of the terminal, whether the maximum transmit power value of each transmit antenna port of the terminal reaches the preset power value.

The antenna transmit capability information may indicate whether the maximum transmit power value of each transmit antenna port reaches the preset power value or indicate the maximum transmit power value of each transmit antenna port. Then, the network device may directly determine, based on the antenna transmit capability information, whether the maximum transmit power value reaches the preset power value; or first determine the maximum transmit power value of each transmit antenna port of the terminal based on the antenna transmit capability information, and then determine, based on the learned maximum transmit power value of each transmit antenna port, whether the maximum transmit power value reaches the preset power value. When the network device is configured with only one SRS resource, the network device measures each SRS port in the SRS resource; considers a factor, namely, a maximum transmit power value that can be used by each SRS port in uplink transmission, and performs compensation calculation on a reference signal sent by each SRS port to estimate a channel state of each SRS port, for example, a signal to interference plus noise ratio (signal to interference plus noise ratio, SINR), a signal-to-noise ratio (signal-noise ratio, SNR), reference signal received power (reference signal receiving power, RSRP), reference signal received quality (reference signal receiving quality, RSRQ); and then selects one or more SRS ports corresponding to an optimal channel state as an SRS port used for uplink transmission, and indicates the SRS port to the terminal by using a TPMI, so that the terminal sends uplink data by using the SRS port indicated by the TPMI.

When the network device is configured with a plurality of SRS resources, each SRS resource is corresponding to one transmit antenna group. The network device obtains a channel state of each transmit antenna group after measuring an SRS sent by the transmit antenna group on a corresponding SRS resource, so as to determine a transmit antenna group corresponding to an optimal channel state; and indicates, by using an SRI, the terminal to send uplink data by using the transmit antenna group. Further, based on a transmit antenna group corresponding to a selected SRS resource, the network device further selects an antenna port in the SRS resource. A selection manner is as follows: The network device measures each SRS port in the SRS resource; considers a factor, namely, a maximum transmit power value that can be used by each SRS port in uplink transmission, and performs compensation calculation on a reference signal sent by each SRS port to estimate a channel state of each SRS port; and then selects one or more SRS ports corresponding to an optimal channel state as an SRS port used for uplink transmission, and indicates the SRS port to the terminal by using an TPMI, so that the terminal sends uplink data by using the SRS port indicated by the TPMI.

Based on the foregoing technical solution, because the network device learns whether the maximum transmit power value of each transmit antenna port of the terminal reaches the preset power value, when performing PUSCH scheduling, the network device comprehensively considers power of each transmit antenna port of the terminal, so that the network device indicates the terminal to perform uplink transmission by using a proper transmit antenna port, thereby ensuring system transmission performance.

The foregoing mainly describes the solutions provided in the embodiments of this application from a perspective of interaction between network elements. It may be understood that, to implement the foregoing functions, the network elements, such as the network device and the terminal, include a corresponding hardware structure and/or software module that is used to perform each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device and the terminal may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in this embodiment of this application, division into modules is an example, and is merely a logical function division. In actual implementation, another division manner may be used. The following provides descriptions by using an example in which each function module is obtained through division based on a corresponding function.

Figure 6:
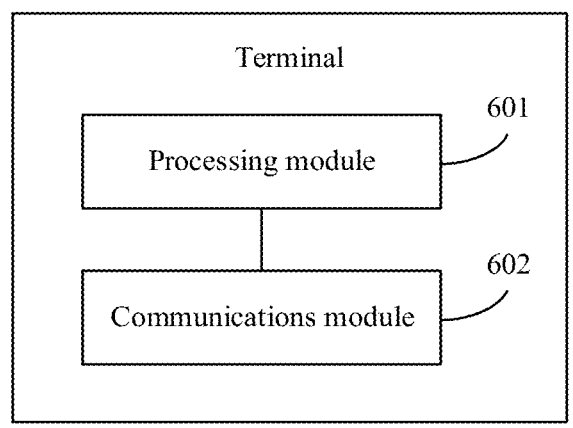
FIG. 6 is a schematic structural diagram of a terminal according to an embodiment of this application.

FIG. 6 is a schematic structural diagram of a terminal according to an embodiment of this application. As shown in FIG. 6, the terminal includes a processing module 601 and a communications module 602. The processing module 601 is configured to support the terminal in performing step S101 in FIG. 5 and/or is used in another process used in the technical solution described in this specification. The communications module 602 is configured to support the terminal in performing step S102 in FIG. 5 and/or is used in another process used in the technical solution described in this specification. All related content of the steps in the foregoing method embodiments may be cited in function descriptions of corresponding function modules, and details are not described herein again.

In an example, with reference to the terminal shown in FIG. 4, the communications module 602 in FIG. 6 may be implemented by the transceiver 303 in FIG. 4, and the processing module 601 in FIG. 6 may be implemented by the processor 301 in FIG. 4. This is not limited in this embodiment of this application.

An embodiment of this application further provides a computer-readable storage medium, where the computer-readable storage medium stores a computer instruction. When the computer-readable storage medium runs on the terminal shown in FIG. 4, the terminal performs the power indication method shown in FIG. 5. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive (solid state disk, SSD)), or the like.

An embodiment of this application further provides a chip system, and the chip system includes a processor, configured to support a terminal in implementing the power indication method shown in FIG. 5. In a possible design, the chip system further includes a memory. The memory is configured to store a program instruction and data that are necessary for the terminal. Certainly, the memory may not be in the chip system. The chip system may include a chip, or may include a chip and another discrete device. This is not specifically limited in this embodiment of this application.

An embodiment of this application further provides a computer program product that includes a computer instruction. When the computer program product runs on the terminal shown in FIG. 4, the computer can perform the power indication method shown in FIG. 5. The terminal, the computer storage medium, the chip system, and the computer program product provided in the foregoing embodiments of this application are all used to perform the foregoing power indication method. Therefore, for their beneficial effects, refer to beneficial effects corresponding to the foregoing method. Details are not described herein again.

Figure 7:
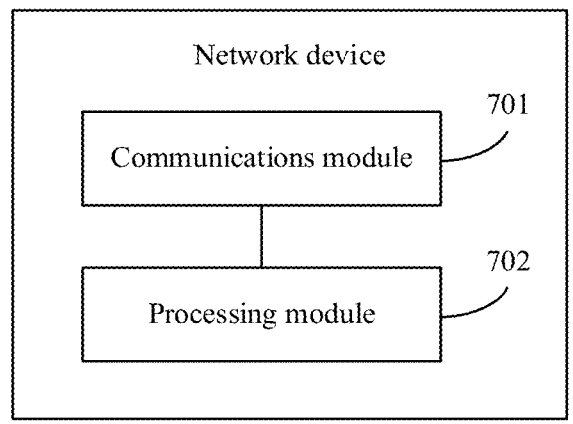
FIG. 7 is a schematic structural diagram of a network device according to an embodiment of this application.

FIG. 7 is a schematic structural diagram of a network device according to an embodiment of this application. As shown in FIG. 7, the network device includes a communications module 701 and a processing module 702. The communications module 701 is configured to support the network device in performing step S102 in FIG. 5, and/or is used in another process of the technical solution described in this specification. The processing module 702 is configured to support the network device in performing step S103 in FIG. 5, and/or is used in another process of the technical solution described in this specification. All related content of the steps in the foregoing method embodiments may be cited in function descriptions of corresponding function modules, and details are not described herein again.

In an example, with reference to the network device shown in FIG. 4, the communications module 701 in FIG. 7 may be implemented by the transceiver 203 in FIG. 4, and the processing module 702 in FIG. 7 may be implemented by the processor 201 in FIG. 4. This is not limited in this embodiment of this application.

An embodiment of this application further provides a computer-readable storage medium, where the computer-readable storage medium stores an instruction. When the computer-readable storage medium runs on the network device shown in FIG. 4, the network device performs the power indication method shown in FIG. 5.

An embodiment of this application further provides a chip system, and the chip system includes a processor, configured to support a network device in implementing the power indication method shown in FIG. 5. In a possible design, the chip system further includes a memory. The memory is configured to store a program instruction and data that are necessary for the terminal. Certainly, the memory may not be in the chip system. The chip system may include a chip, or may include a chip and another discrete device. This is not specifically limited in this embodiment of this application.

An embodiment of this application further provides a computer program product that includes a computer instruction. When the computer program product runs on the network device shown in FIG. 4, the computer can perform the power indication method shown in FIG. 5.

The network device, the computer storage medium, the chip system, and the computer program product provided in the foregoing embodiments of this application are all used to perform the foregoing power indication method. Therefore, for their beneficial effects, refer to beneficial effects corresponding to the foregoing method. Details are not described herein again.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A power indication method, wherein the method comprises:
   receiving antenna transmit capability information from a terminal device, wherein the antenna transmit capability information indicates whether a maximum transmit power value of a physical uplink shared channel (PUSCH) corresponding to each sounding reference signal (SRS) port in a SRS resource reaches a preset power value; and
   determining based on the antenna transmit capability information, whether the maximum transmit power value of the PUSCH corresponding to each SRS port in the SRS resource reaches the preset power value.

2. The power indication method according to claim 1, wherein the antenna transmit capability information comprises power indication information corresponding to each SRS port, wherein the power indication information indicates whether the maximum transmit power value of the PUSCH corresponding to the SRS port reaches the preset power value.

3. The power indication method according to claim 1, wherein the preset power value is a maximum transmit power value corresponding to a power class of the terminal device.

4. The power indication method according to claim 1, wherein each SRS port corresponds to a power amplifier.

5. A communications apparatus, comprising:
   at least one processor; and
   one or more memories coupled to the at least one processor and storing programming instructions for execution by the at least one processor to perform operations comprising:
   receiving antenna transmit capability information from a terminal device, wherein the antenna transmit capability information indicates whether a maximum transmit power value of a physical uplink shared channel (PUSCH) corresponding to each sounding reference signal (SRS) port in a SRS resource reaches a preset power value; and
   determining based on the antenna transmit capability information, whether the maximum transmit power value of the PUSCH corresponding to each SRS port in the SRS resource reaches the preset power value.

6. The communications apparatus according to claim 5, wherein the antenna transmit capability information comprises power indication information corresponding to each SRS port, wherein the power indication information indicates whether the maximum transmit power value of the PUSCH corresponding to the SRS port reaches the preset power value.

7. The communications apparatus according to claim 5, wherein the preset power value is a maximum transmit power value corresponding to a power class of the terminal device.

8. The communications apparatus according to claim 5, wherein each SRS ports corresponds to a power amplifier.

9. A non-transitory computer-readable storage medium storing a program or instructions for execution by at least one processor to perform operations comprising:
   receiving antenna transmit capability information from a terminal device, wherein the antenna transmit capability information indicates whether a maximum transmit power value of a physical uplink shared channel (PUSCH) corresponding to each sounding reference signal (SRS) port in a SRS resource reaches a preset power value; and
   determining based on the antenna transmit capability information, whether the maximum transmit power value of the PUSCH corresponding to each SRS port in the SRS resource reaches the preset power value.

10. The non-transitory computer-readable storage medium according to claim 9, wherein the antenna transmit capability information comprises power indication information corresponding to each SRS port, wherein the power indication information indicates whether the maximum transmit power value of the PUSCH corresponding to the SRS port reaches the preset power value.

11. The non-transitory computer-readable storage medium according to claim 9, wherein the preset power value is a maximum transmit power value corresponding to a power class of the terminal device.

12. The non-transitory computer-readable storage medium according to claim 9, wherein each SRS port corresponds to a power amplifier.

* * * * *